United States Patent [19]

Deml et al.

[11] 4,009,386

[45] Feb. 22, 1977

[54] METHOD AND ARRANGEMENT FOR AUTOMATICALLY FOCUSSING AN OBJECTIVE ONTO A SUBJECT, USING AUTOCOLLIMATION

[75] Inventors: Reinhold Deml, Munich; Ulrich Greis, Weyarn, both of Germany

[73] Assignee: AGFA-Gevaert A.G., Leverkusen, Germany

[22] Filed: Oct. 3, 1975

[21] Appl. No.: 619,396

[30] Foreign Application Priority Data

Oct. 5, 1974 Germany ............................ 2447663

[52] U.S. Cl. .................................. 250/201; 354/25
[51] Int. Cl.² ............................................ G01J 1/20
[58] Field of Search ........ 250/201, 202, 203, 234 R, 250/237 G; 356/4, 5; 354/25

[56] References Cited
UNITED STATES PATENTS

| | | |
|---|---|---|
| 3,783,270 | 1/1974 | Kamachi ............................ 250/201 |
| 3,833,807 | 9/1974 | Takeda ............................ 250/237 G |
| 3,906,389 | 9/1975 | Matsumoto ....................... 250/201 |

Primary Examiner—David C. Nelms
Attorney, Agent, or Firm—Michael J. Striker

[57] ABSTRACT

An optical apparatus is provided with an objective and an autocollimation lens having a position and orientation bearing a known relationship to the position and orientation of the objective. A grating has alternating transmissive and non-transmissive portions. The grating is so positioned relative to the autocollimation path of the autocollimation lens that the latter projects an image of the grating onto the subject, and the image of the grating on the subject is projected back onto the grating. A photoelectric detector derives from the light projected back onto the grating an electrical signal indicative of the degree of focus of the objective. The setting of the objective is controlled in dependence upon the electrical signal.

18 Claims, 5 Drawing Figures

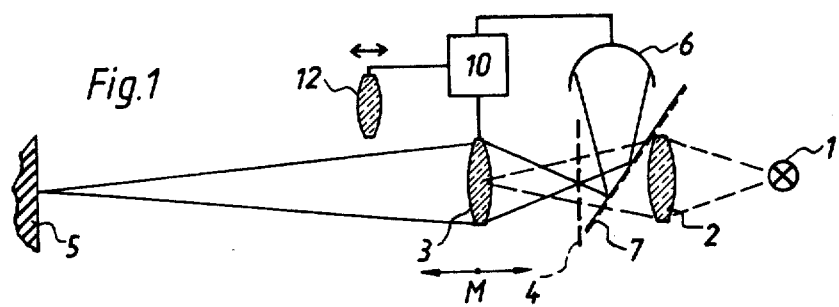
Fig.1
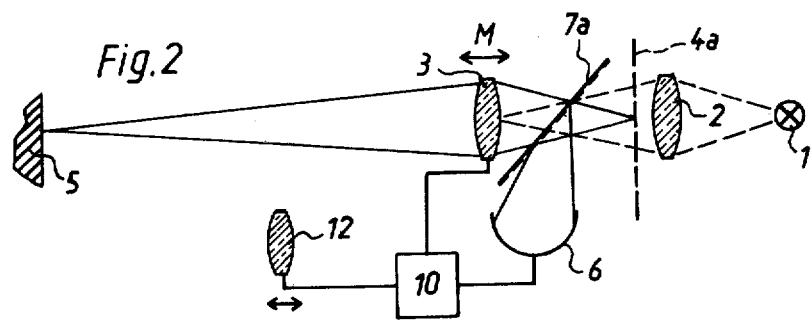
Fig.2
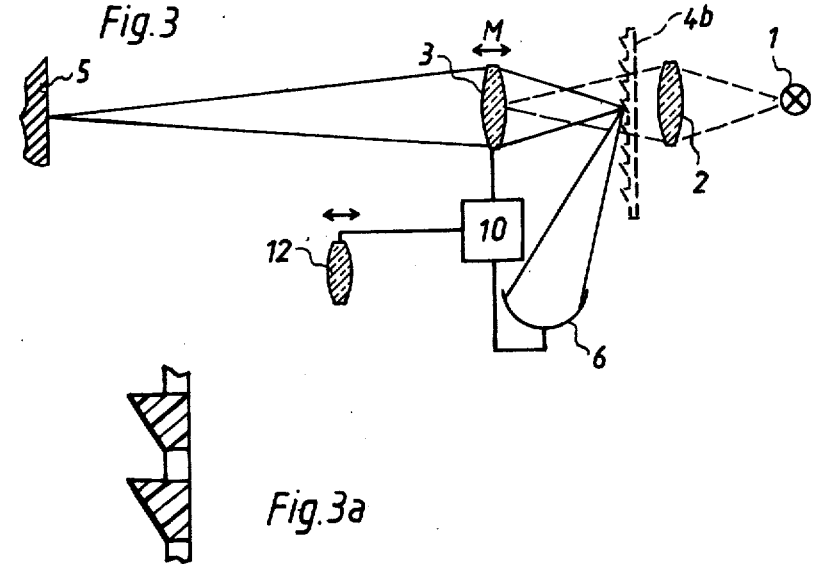
Fig.3
Fig.3a

METHOD AND ARRANGEMENT FOR AUTOMATICALLY FOCUSSING AN OBJECTIVE ONTO A SUBJECT, USING AUTOCOLLIMATION

BACKGROUND OF THE INVENTION

The invention relates to a method and arrangement for automatically focussing an objective onto a subject or test object. More particularly, the invention relates to automatic focussing expedients involving autocollimation and the use of gratings for generating an electrical signal which can be used to control the operation of means for automatically adjusting the setting of the objective.

It has been many times proposed (for example in Federal Republic of Germany published patent application DT-OS 1,908,687) to use gratings or rasters located in the autocollimation beam path of a camera objective or autocollimation objective. Specifically, these known expedients have involved the projection of the image of one grating onto the subject or test object. Then the image, on the subject, of the first grating is projected, using autocollimation, onto the second grating. The extent to which the image of the first grating registers with the second grating is detected photoelectrically, by detecting the intensity of the light projected onto the second grating, and an electrical signal is generated for controlling electromechanical means for effecting proper or optimal focussing of the objective.

The known proposals for effecting automatic focussing in this way have not, to our knowledge, met with any practical success. The reason for this, at least in part, is that the use of two discrete gratings or rasters is relatively complicated and expensive, because they must be properly adjusted relative to each other and kept properly adjusted with very great precision.

SUMMARY OF THE INVENTION

It is a general object of the invention to provide a method and arrangement for effecting automatic focussing of an objective in which use can be made of only a single grating or raster in the autocollimation path of the objective or separate autocollimation lens.

According to the most general concept of the present invention, this object is achieved by projecting the image of the light-transmitting portions of the grating onto the subject or test object, and then projecting such image on the subject back along the autocollimation path onto the selfsame grating.

In this way, it becomes possible to dispense altogether with the second grating, obviating the necessity for the complicated and difficult fine adjustment of the relative positions of the two gratings.

The invention also embraces a number of particular concepts concerning the disposition of components of an optical system to effect the above-mentioned action in a variety of ways. However, these will best be understood from the description, below, of preferred embodiments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 depicts a first embodiment of the invention in which the grating employed in a transmission-absorption grating;

FIG. 2 depicts a second embodiment of the invention in which the grating employed is a transmission-reflection in which the grating employed is a transmission-reflection grating;

FIG. 3 depicts a third embodiment of the invention in which the grating employed is comprises of alternating first and second portions, with the first portions being transmissive and the second portions being inclined reflecting surface portions;

FIG. 3a is an enlarged-scale view of a portion of the grating of FIG. 3; and

DESCRIPTION OF THE PREFERRED EMBODIMENTS

Figure 4:
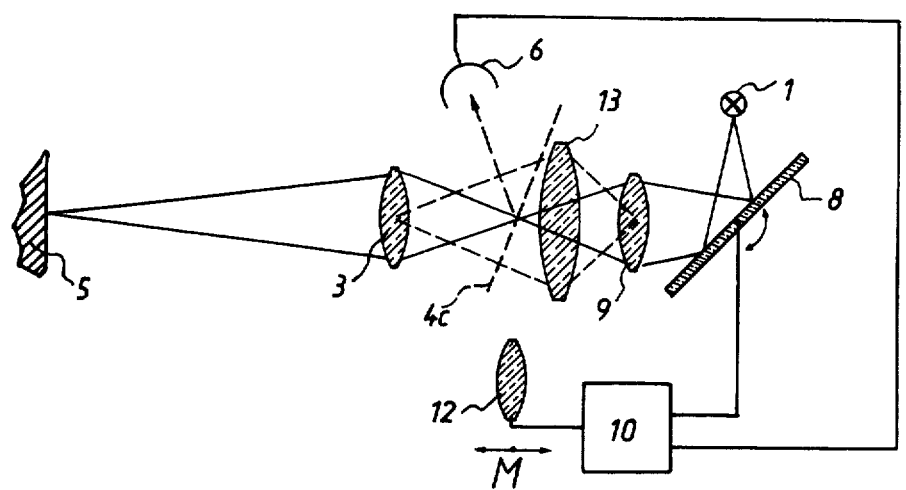
FIG. 4 depicts a fourth embodiment of the invention in which the grating employed is a transmission-reflection grating arranged at an angle relative to the autocollimation path.

In the embodiment of FIG. 1, a source 1 of modulated light transmits light through a condenser 2 through an inclined semitransmissive mirror 7 towards an absorptiontransmission grating 4. The grating 4 is comprises of light-transmissive portions which alternate with nontransmissive portions. The light passing leftwards through the transmissive portions of grating 4 is projected by an autocollimation objective 3 onto the subject or test object 5, to form on the subject 5 an image of the transmissive portions of the grating 4. The light from the image on the subject 5 is reflected back towards the autocollimation objective 3, which in turn projects the light image on the subject 5 back onto the grating 4. The back-reflected light passing through the transmissive portions of grating 4 impinges upon the front surface of semitransmissive mirror 7 and is deflected out of the autocollimation path towards a photoelectric detector 6 operative for generating a signal whose value is indicative of the intensity of received light.

The electrical signal generated by the photoelectric detector 6 serves as a control signal applied to means 10 for adjusting the settings of the autocollimation objective 3 and of an associated camera objective 12. The autocollimation objective 3 can be shifted in the directions indicated by the double-headed arrow M, and the adjusting means 10 also effects corresponding shifting adjustment of the camera objective 12.

The construction of the adjusting means 10 does not as such form part of the present invention. However, by way of example, the adjusting means 10 can be comprised of a positioning motor activatable by the user of the camera to move the autocollimation objective 3 and accordingly the camera objective 12 through their entire range of distance settings. During the performance of this range of movement, the value of the photoelectric signal applied to adjusting means 10 will change. The adjusting means 10 can include a resettable circuit for detecting and registering an extreme value of the light-indicating signal. Thereafter, the adjusting means 10 causes the autocollimation objective 3 and the camera objective 12 to be moved once more through their entire range of distance settings. However, during the movement, as soon as the value of the light-indicating signal reaches the extreme value registered during the preceding cycle of movement, the adjusting motor stops, so that the autocollimation objective 3 and camera objective 12 will assume and maintain the position corresponding to the extreme value of the light-indicating signal. These positions are assumed to correspond to proper, or at least optimal, focus. It will be understood that the manner of operation of the adjusting means 10 just explained could be principle be different.

In the embodiment of FIG. 1 the splitting of the light beam does not occur until after the light, during its return trip, passes through the transmissive portions of the grating 4 a second time. In this embodiment, the extreme value to which the adjusting means 10 responds will be the maximum light intensity value as indicated by the maximum photocurrent.

It will be understood that the adjusting means 10 can adjust the distance settings of autocollimation objective 3 and of camera objective 12 in two separate but simultaneous actions, or else adjust the setting of only one of the objectives, with the other objective being connected, via a suitably designed linkage, to assume pre-determined settings pre-correlated with the settings of the first objective.

In the embodiment of FIG. 2, the grating 4a is a transmission-reflection grating. It is comprised of alternating transmissive and non-transmissive portions. The non-transmissive portions, at the side of the grating facing towards the subject or test object 5, are mirrored so as to be reflecting.

In the embodiment of FIG. 2, the modulated light from source 1 is projected by condenser 2 through the transmissive portions of grating 4a, and through a semitransmissive mirror 7a towards an autocollimation objective 3 which projects an image of the transmissive portions of the grating 4a onto the surface of the subject or test object 5. At the same time, the autocollimation objective 3 projects an image of the light image on subject 5 back through semitransmissive mirror 7a onto the grating 4a. It will be noted that in the embodiments of both FIGS. 1 and 2 the grating is located in the back focal plane of the autocollimation objective 3. The light projected back onto the grating 4a is reflected off the reflecting grating portions towards the back side of semitransmissive mirror 7a, and from there is reflected towards the photoelectric detector 6. The signal generated by photoelectric detector 6 is utilized to control the adjusting means 10 in the manner described with respect to FIG. 1. In the embodiment of FIG. 2, however, the objectives 3 and 12 are automatically stopped in positions corresponding to minimum light intensity and minimum value of the photocurrent.

In the embodiment of FIG. 3, the grating 4b employed is comprised of alternating first and second portions. The first portions are simple transmissive portions. The second portions have inclined mirrored surfaces each making an angle with respect to the general plane of the grating 4b. The grating 4b of FIG. 3 is depicted, on a larger scale and in somewhat greater detail, in FIG. 3a. The use of a grating 4b having the illustrated inclined reflecting surfaces makes unnecessary the use of the separate semitransmissive mirrors 7 and 7a of FIGS. 1 and 2.

IN the embodiment of FIG. 3, modulated light from source 1 is projected by condenser 2 through the transmissive portions of grating 4b towards the autocollimation objective 3. The autocollimation objective 3 projects an image of the transmissive portion of the grating 4b onto the surface of subject or test object 5. At the same, the autocollimation objective 3 projects an image of light image on subject 5 back towards the surface of grating 4b. The part of the back-reflected light incident upon the reflecting inclined surface portions of grating 4b are deflected out of the autocollimation path towards the photoelectric detector 6. In other respects, the automatic focussing is performed as explained with reference to FIGS. 1 and 2.

In the embodiment of FIG. 4, use is made of a transmission-reflection grating 4c comprised of alternating transmissive and non-transmissive portions, with the non-transmissive portions being reflecting at the side of the grating4c facing towards the subject or test object 5. In FIG. 4, the light source 1 is not lined up with the optical axis of the autocollimation objective 3. Instead, the light source 1 cooperates with a pivotally mounted mirror 8 which deflects light from source 1 towards a cylindrical lens 9 to effect a linewise or strip-formed illumination of the grating 4c. The angle of inclination of grating 4c relative to the optical axis of autocollimation objective 3 is no selected that, during each period of movement of the pivotal mirror 8, the system goes through its whole range of distance settings. However, if the autocollimation objective 3 has a short focal lenght, which is usually the case, there may not be space enough in the lens arrangement to allow the deflection of a sufficient amount of light out of the autocollimation path and towards the photodetector 6. With this in mind, use is preferably made of the type of grating depicted in FIGS. 3 and 3a, to increase the angle of deflection of the back-reflected light, and use is furthermore preferably made of a field lens 13 whch serves, in a per se conventional manner, to increase the intensity of the light.

The arrangement of FIG. 4 operates somewhat differently from the arrangements of FIGS. 1-3. In FIGS. 1-3, the autocollimation objective 3 and the camera objective 12 were both moves through their whole range of distance settings and then stopped at the setting corresponding to an extreme value of the photocurrent generated by photodetector 6. In FIG. 4, however, the autocollimation objective 3 is not moved during the automatic focussing operation. Instead, the setting of the camera objective 12 is correlated with the angular position of the pivoting mirror 8. During a first or test run-through, the adjusting means 10 moves the camera objective 12 through its entire range of distance settings while simultaneously moving the pivotaing mirror 8 through its entire range of pivotal movement. For example, the camera objective 12 and the pivoting mirror 8 can be connected by a suitably designed linkage. A circuit in the adjusting means 10 registers an extreme value of the photocurrent generated during this period of movement. The cycle of movement is then repeated, and the pivoting mirror 8 and camera objective 12 are stopped when they reach a position corresponding to the extreme photocurrent value registered during the preceding cycle of movement. In this embodiment, the extreme value in question will be a photocurrent minimum.

In the foregoing embodiments, use has been made of an autocollimation objective 3 discrete from the camera objective 12. However, it is also within the scope of the invention to utilize the camera objective itself to project the image of the light-transmissive grating portions back onto the grating.

It will be understood that each of the elements described above, or two or more together, may also find a useful application in other types of constructions and arrangements, differing from the types described above.

While the invention has been illustrated and described as embodied in an automatic focussing arrangement making use of separate camera and autocollimation objectives, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt if for various applications without omitting features that, from the standpoint of prior art, fairly constitute essential characteristics of the generic or specific aspects of this invention.

What is clamed as new and desired to be protected by Letters Patent is set forth in the appended claims.

1. A method for automatically focussing onto a subject the objective of an optical apparatus provided with autocollimation lens means having a position bearing a predetermined relationship to the position of the objective, comprising the steps of so positioning a grating relative to the autocollimation path of the autocollimation lens means as to cause the latter to project an image of the grating onto the subject and to cause the image of the grating on the subject to be projected back onto the grating and into steady register with the grating structure to an extent dependent upon the degree of focus of the objective; using photoelectric means to derive from the light projected back onto the grating an electrical signal indicative of the extent to which the image of the grating projected back onto the grating is in steady register with the grating structure and accordingly indicative of the degree of focus of the objective; and controlling the operation of means for adjusting the setting of the objective by applying the electrical signal to such means.

2. The method defined in claim 1, wherein the step of positioning the grating comprises using a absorption-transmission grating having alternating transparent and non-transparent portions and positioning the grating in the region of the focal plane of the autocollimation lens means at that side of the autocollimation lens means which faces away from the subject and intermediate the autocollimation lens means and semitransmissive mirror arranged intermediate the autocollimation lens means and a light source in such a manner that light from the light source is transmitted through the semitransmissive mirror and through the absorption-transmission grating, projected by the autocollimation lens means onto the subject, reflected back from the subject and projected back onto and through the grating onto the semitransmissive mirror, and reflected off the semitransmissive mirror to the photoelectric means.

3. The method defined in claim 1, wherein the step of positioning the grating comprises using a transmission-reflection grating having alternating transmissive and reflecting portions and positioning the grating in the region of the focal plane of the autocollimation lens means at that side of the autocollimation lens means which faces away from the subject and intermediate a light source and a semitransmissive mirror arranged between the grating and the autocollimation lens means in such a manner that light from the light source is transmissive grating portions and through the semitransparent mirror towards the autocollimation lens means and projected by the latter onto the subject, reflected back from the subject projected back through the semitransmissive mirror onto the reflecting grating portions, reflected from the reflecting grating portions onto the semitransmissive mirror, and reflected from the semitransmissive mirror onto the photoelectric means.

4. The method defined in claim 1, wherein the step of positioning the grating comprises using a grating having alternating first and second portions, the first portions being transmissive portions and the second portions being inclined reflecting portions lying in respective planes each oriented at an angle to the general plane of the grating, and positioning the grating in the region of the focal plane of the autocollimation lens means intermediate the latter and a light source with the inclined reflecting portions facing towards the subject and in such a manner that light from the light source is transmitted through the transmissive portions of the grating towards the autocollimation lens means, projected by the latter onto the subject, reflected back from the subject towards the autocollimation lens means, projected by the latter onto the grating, and reflected off the inclined reflecting portions of the grating onto the photoelectric means.

5. The method defined in claim 1, wherein the step of positioning the grating comprises using a transmission-reflection grating having alternating transmissive and reflecting portions, positioning the grating in the region of the focal plane of the autocollimation lens means but inclined relative to the optical axis of the autocollimation lens means, projecting light through the grating using a light source and a pivotable mirror which receives light from the light source and reflects the received light towards the grating so that the light from the source passes through the grating, is projected by the autocollimation lens means onto the subject, is reflected back from the subject and projected by the autocollimation lens means onto the grating, and reflected off the reflecting grating portions at an angle to the optical axis of the autocollimation lens means and towards the photoelectric means, wherein the step of using photoelectric means to derive an electrical signal comprises pivoting the pivotable mirror until the electrical signal assumes a value indicative of a certain degree of focus.

6. A method for automatically focusing the objective of an optical apparatus onto a subject using autocollimation, comprising the steps of so positioning a grating relative to the autocollimation path of the objective as to cause the latter to project an image of the grating onto the subject and to cause the image of the grating on the subject to be projected back onto the grating and into steady register with the grating structure to an extent dependent upon the degree of focus of the objective; using photoelectric means to derive from the light projected back onto the grating an electrical signal indicative of the extent to which the image of the grating projected back onto the grating is in steady register with the grating structure and accordingly indicative of the degree of focus of the objective; and controlling the operation of means for adjusting the setting of the objective by applying the electrical signal to such means.

7. The method defined in claim 6, wherein the step of positioning the grating comprises using an absorptiontransmission grating having alternating transparent and nontransparent portions and positioning the grating in the region of the focal plane of the objective at that side of the objective which faces away from the subject and intermediate the objective and a semitransmissive mirror arranged intermediate the objective and a light source in such a manner that light from the light source is transmitted through the semitransmissive mirror and through the adsorption-transmission grating, projected by the objective onto the subject, reflected back from the subject and projected back onto and through the grating ont the semitransmissive mirror, and reflected off the semitransmissive to the photoelectric means.

8. The method defined in claim 6, wherein the step of positioning the grating comprises using a transmission-reflection grating having alternating transmissive and reflecting portions and positioning the grating in the region of the focal plane of the objective at that side of the objective which faces away from the subject and intermediate a light source and a semitransmissive mirror arranged between the grating and the objective in such a manner that light from the light source is transmitted through the transmissive grating portions and through the semitransparent mirror towards the objective and projected by the latter onto the subject, reflected back from the subject projected back through the semitransmissive mirror onto the reflecting grating portions, reflected from the the reflecting grating portions onto the semitransmissive mirror, and reflected from the semitransmissive mirror onto the photoelectric means.

9. The method defined in claim 6, wherein the step of positioning the grating comprises using a grating having alternating first and second portions, the first portions being transmissive portions and the second portions being inclined reflecting portions lying in respective planes each oriented at an angle to the general plane of the grating in the region of the focal plane of the objective intermediate the latter and a light source with the inclined reflecting portions facing towards the subject and in such a manner that light from the light source is transmitted through the transmissive portions of the grating towards the objective, projected by the latter onto the subject, reflected back from the subject towards the objective, projected by the latter onto the grating, and reflected off the inclined reflecting portions of the grating towards the photoelectric means.

10. In an optical apparatus having an objective, an arrangement for automatically focussing the objective onto a subject, comprising, in combination, autocollimation lens means having a position and orientation bearing a predetermined relationship to the position and orientation of the objective; a light source located to that side of the autocollimation lens means which faces away from the subject; a grating having alternating transmissive and non-transmissive portions, the grating being located intermediate the light source and the autocollimation lens means and so positioned that an illuminated image of the grating is projected by the autocollimation lens means onto the subject, reflected back from the subject towards the autocollimation lens means and projected back onto the grating and into steady register with the grating structure to an extent dependent upon the degree of focus of the objective; photoelectric means operative for deriving from the light projected back onto the grating an electrical signal indicative of the extent to which the image of the grating projected back onto the grating is in steady register with the grating structure and accordingly indicative of the degree of focus of the objective; and adjusting means operative for adjusting the setting of the objective in dependence upon the electrical signal.

11. The apparatus defined in claim 10, where in the grating is a transmission-absorption grating having alternating transmissive and absorptive portions, and further including a semitransmissive mirror located intermediate the grating and the light source and having a position and orientation such that light from the image of the grating on the subject reflected back onto the grating passes through the transmissive portions of the grating to the semitransmissive mirror and is reflected off the latter to the photoelectric means.

12. The apparatus defined in claim 10, wherein the grating is a tranmission-reflection grating having alternating transmissive and reflecting portions, and further including a semitransmissive mirror located intermediate the grating and the autocollimation lens means and having a position and orientation such that light from the image of the grating on the subject reflected back towards the autocollimation lens means is projected by the latter through the semitransmissive mirror onto the grating towards the semitransmissive mirror, and reflected off the latter towards the photoelectric means.

13. The apparatus defined in claim 10, wherein the grating is a grating having alternating first and second portions, the first portions being transmissive portions and the second portions being inclined reflecting portions lying in respective planes each oriented at an angle to the general plane of the grating, the grating being so positioned and oriented relative to the autocollimation path of the autocollimation lens means and relative to the photoelectric means that light from the image of the grating on the subject reflected back onto the grating is reflected off the inclined reflecting portions of the grating towards the photoelectric means.

14. The apparatus defined in claim 10, wherein the grating is a transmissive-reflection grating having alternating transmissive and reflecting portions, the grating being located in the region of the focal plane of the autocollimation lens means but inclined relative to the optical axis of the autocollimation lens means, the position and orientation of the grating being such that light from the image of the grating on the subject reflected back onto the grating is reflected off the reflecting portions of the grating towards the photoelectric means, and further including a pivotally mounted mirror between the grating and the light source, and said adjusting means for adjusting the setting of the objective in dependence upon the electrical signal comprising means for adjusting the setting of the objective in dependence upon both the electrical signal and the angular position of the pivotally mounted mirror.

15. In an optical apparatus having an objective, an arragement for automatically focussing the objective onto a subject using the effect of autocollimation comprising, in combination, a light source located to that side of the objective which faces away from the subject; a grating having alternating transmissive and non-transmissive portions, the grating being located intermediate the light source and the objective and so positioned that an illuminated image of the grating is projected by the objective onto the subject, reflected back from the subject towards the objective and projected back onto the grating and into steady register with the grating structure to an extent dependent upon the degree of focus of the objective; photoelectric means operative for deriving from the light projected back onto the grating an electrical signal indicative of the extent to which the image of the grating projected back onto the grating is in steady register with the grating structure and accordingly indicative of the degree of focus of the objective; and adjusting means operative for adjusting the setting of the objective in dependence upon the electrical signal.

16. The apparatus defined in claim 15, wherein the grating is a transmission-absorption grating having alternating transmissive and absorptive portions, and further including a semitransmissive mirror located intermediate the grating and the light source and having a position and orientation such that light from the image of the grating on the subject reflected back onto the grating passes through the transmissive portions of the grating to the semitransmissive mirror and is reflected off the latter to the photoelectric means.

17. The apparatus defined in claim 15, wherein the grating is a transmission-reflection grating having alternating transmissive and reflecting portions, and further including a semitransmissive mirror located intermediate the grating and the objective and having a position and orientation such that light from the image of the grating on the subject reflected back towards the objective is projected by the latter through the semitransmissive mirror onto the grating, reflected off the reflecting portions of the grating towards the semitransmissive mirror and reflected off the latter towards the photoelectric means.

18. The apparatus defined in claim 15, wherein the grating is a grating having alternating first and second portions, the first portions being transmissive portions and the second portions being inclined reflecting portions lying in respective planes each oriented at an angle to the general plane of the grating, the grating being so positioned and oriented relative to the autocollimation path of the objective and relative to the photoelectric means that light from the image of the grating on the subject reflected back onto the grating is reflected off the inclined reflecting portions of the grating towards the photoelectric means.

* * * * *